(12) United States Patent
Shaffer et al.

(10) Patent No.: US 10,466,727 B2
(45) Date of Patent: Nov. 5, 2019

(54) WATER SUPPLY SYSTEM AND A METHOD FOR OPERATING THE SAME

(71) Applicant: Haier US Appliance Solutions, Inc., Wilmington, DE (US)

(72) Inventors: Ryan Joseph Shaffer, Tipp City, OH (US); Adam Christopher Hofmann, Louisville, KY (US); Matthew David Mersch, Louisville, KY (US)

(73) Assignee: Haier US Appliance Solution, Inc., Wilmington, DE (US)

( * ) Notice: Subject to any disclaimer, the term of this patent is extended or adjusted under 35 U.S.C. 154(b) by 367 days.

(21) Appl. No.: 15/358,175

(22) Filed: Nov. 22, 2016

(65) Prior Publication Data
US 2018/0143656 A1    May 24, 2018

(51) Int. Cl.
| G05D 23/00 | (2006.01) |
| G05D 23/20 | (2006.01) |
| G05D 11/16 | (2006.01) |
| G05D 23/13 | (2006.01) |

(52) U.S. Cl.
CPC ......... *G05D 23/2039* (2013.01); *G05D 11/16* (2013.01); *G05D 23/13* (2013.01); *G05D 23/2034* (2013.01); *G05D 23/00* (2013.01)

(58) Field of Classification Search
CPC ..... G05D 23/1393; G05D 23/19; G05D 23/00
See application file for complete search history.

(56) References Cited

U.S. PATENT DOCUMENTS

| 8,162,236 | B2* | 4/2012 | Rodenbeck | E03C 1/057 239/390 |
| 8,945,315 | B2 | 2/2015 | Grull et al. | |
| 9,390,381 | B2 | 7/2016 | Davari et al. | |
| 9,746,224 | B2* | 8/2017 | Lu | F25B 49/02 |
| 9,823,632 | B2* | 11/2017 | Pham | F04C 18/0215 |
| 10,086,674 | B2* | 10/2018 | Gilley | B60H 1/00021 |
| 10,174,977 | B2* | 1/2019 | Lin | F25B 49/02 |
| 10,309,405 | B2* | 6/2019 | Arensmeier | F04D 25/06 |
| 2002/0153425 | A1* | 10/2002 | Mountford | G05D 23/1393 236/12.12 |
| 2003/0080194 | A1* | 5/2003 | O'Hara | G05D 23/1393 236/12.12 |
| 2005/0121529 | A1* | 6/2005 | DeLangis | G05D 23/1393 236/12.12 |
| 2006/0027676 | A1* | 2/2006 | Buck | A01C 23/042 239/63 |
| 2008/0112843 | A1* | 5/2008 | Peel | G05D 23/1393 422/2 |
| 2011/0042468 | A1 | 2/2011 | Lee | |
| 2015/0276265 | A1* | 10/2015 | Davari | H04L 67/025 700/300 |
| 2016/0010878 | A1 | 1/2016 | Lee et al. | |

* cited by examiner

*Primary Examiner* — Ljiljana V. Ciric
*Assistant Examiner* — Alexis K Cox
(74) *Attorney, Agent, or Firm* — Dorrity & Manning, PA

(57) ABSTRACT

A system and method of operating a water supply system with one or more water consuming appliances includes a water heater fluidly coupled to a water consuming appliance through a supply conduit. The water consuming appliance includes an appliance communication module for communicating a target temperature. A mixing valve is positioned on the supply conduit, is in operative communication with the appliance communication module, and heats water from the water heater and cold water from the water supply to provide a flow of supply water to the water consuming appliance at the target temperature.

6 Claims, 4 Drawing Sheets

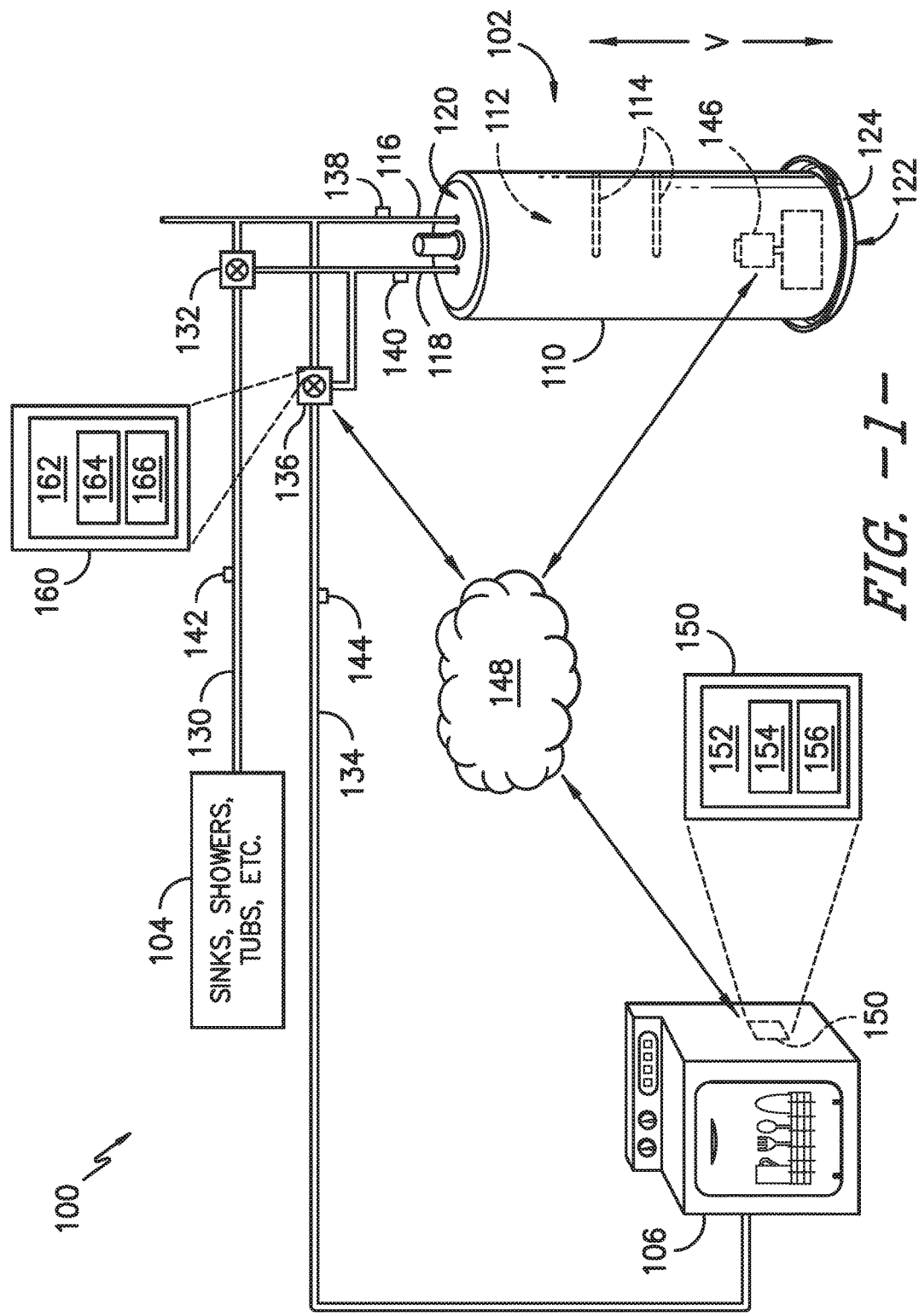
FIG. -1-

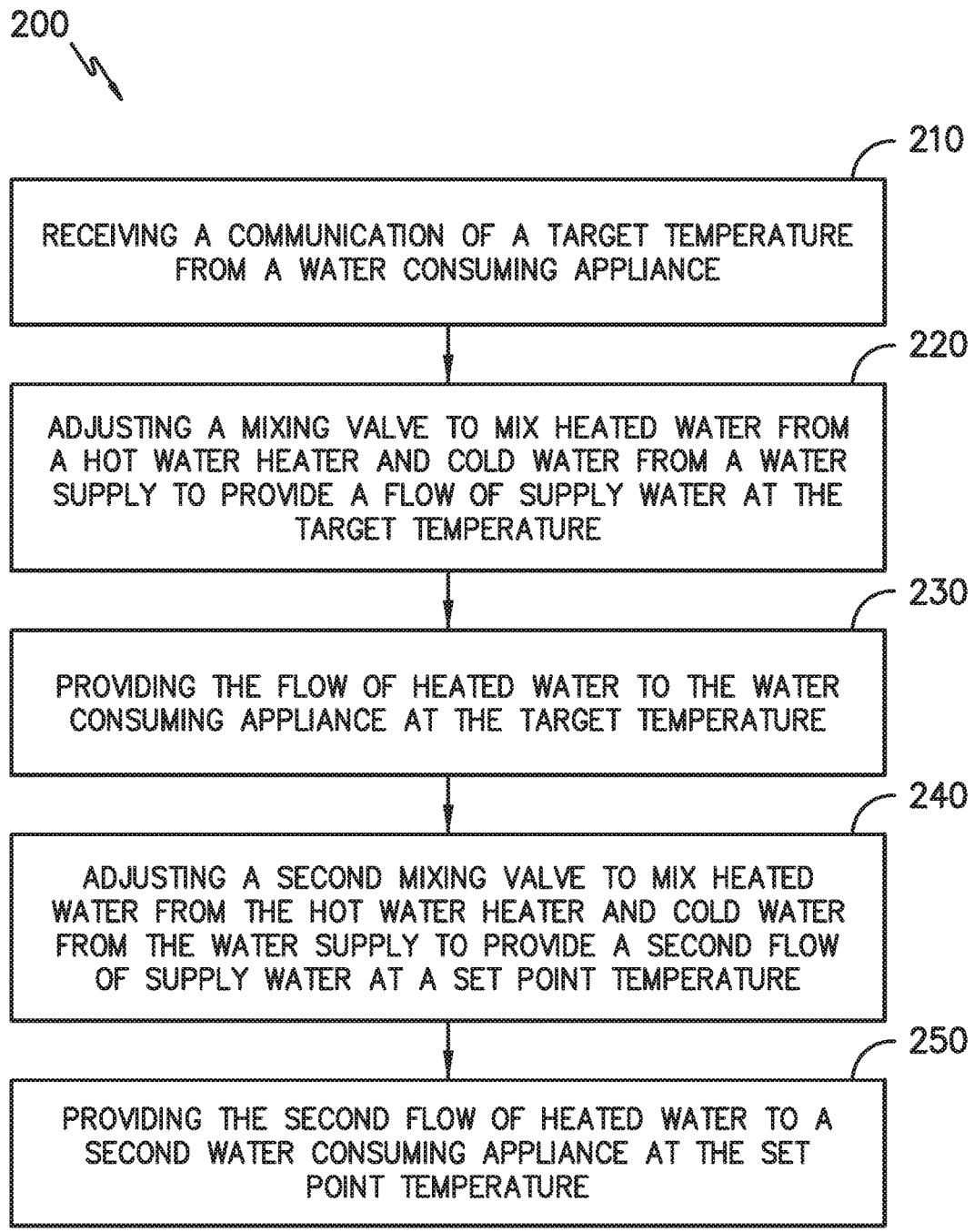
FIG. -2-

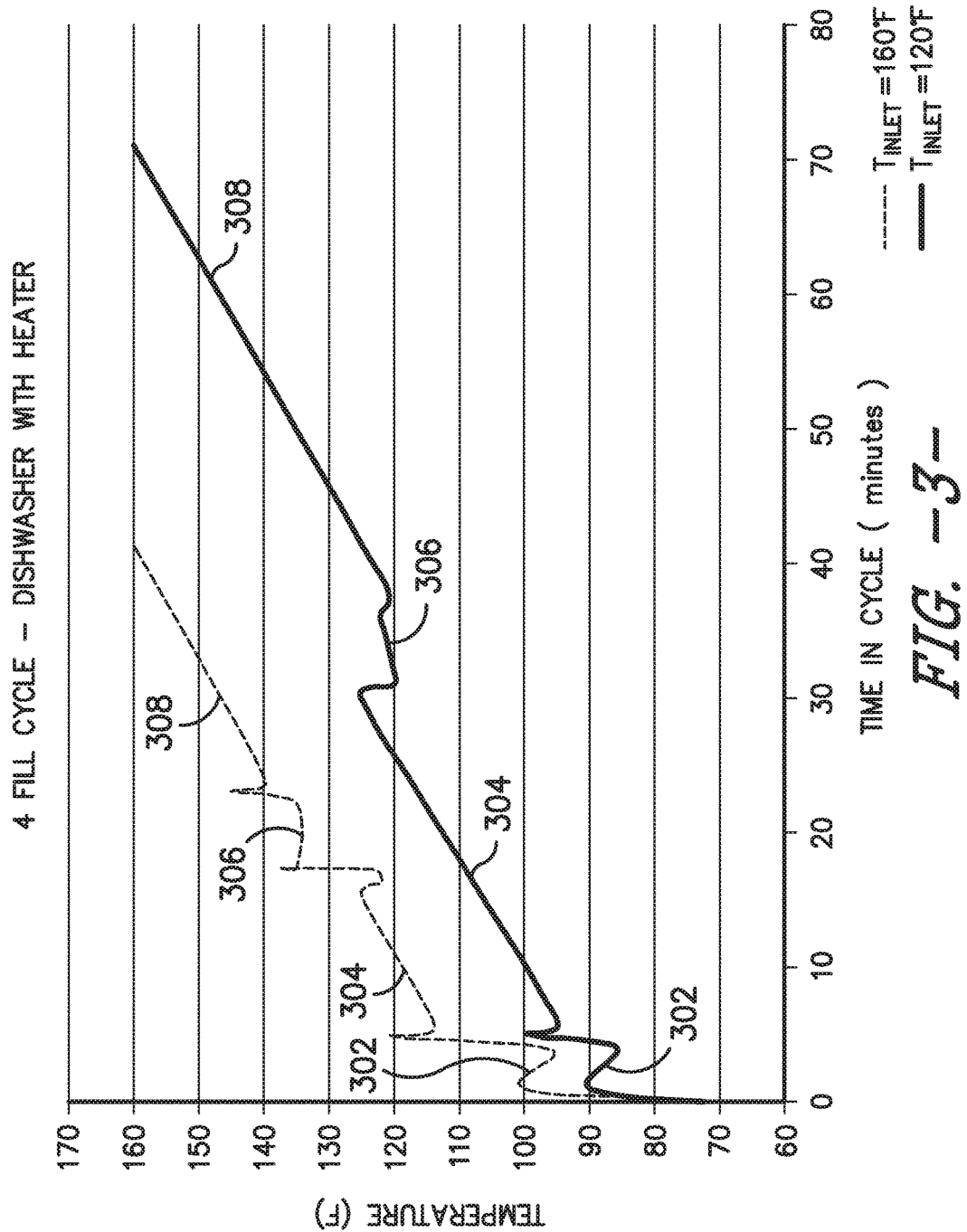

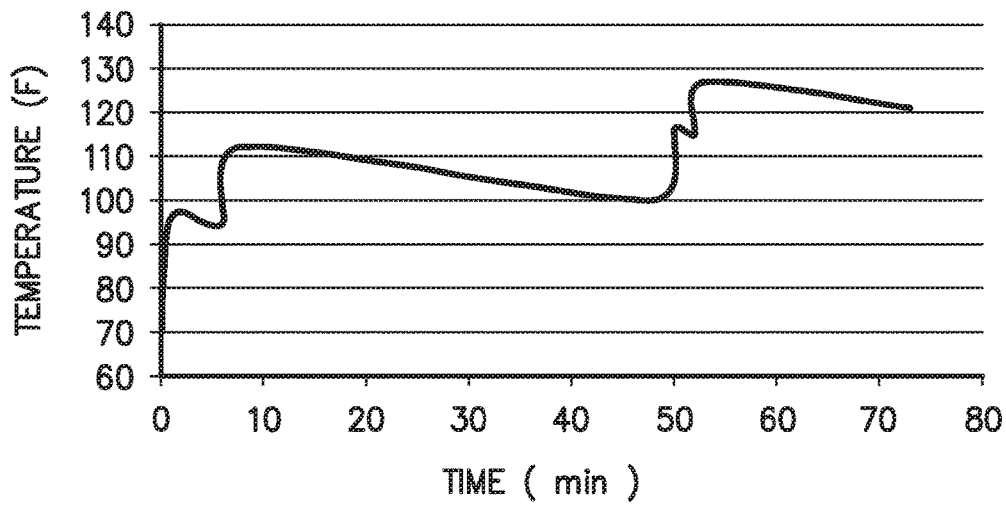
FIG. -4-
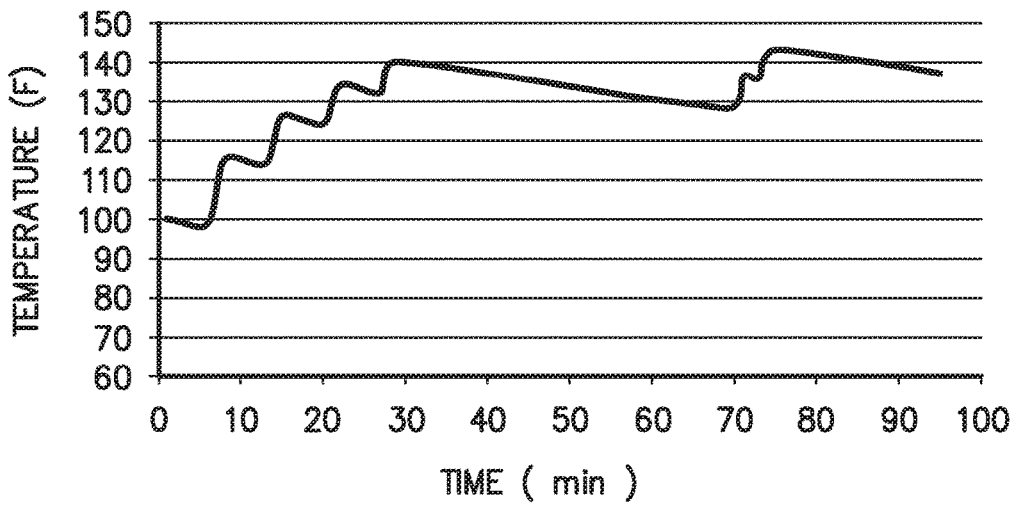
FIG. -5-

WATER SUPPLY SYSTEM AND A METHOD FOR OPERATING THE SAME

FIELD OF THE INVENTION

The present subject matter relates generally to water heaters and water consuming appliances, and more particularly to methods for controlling the temperature of a flow of water from a water heater to one or more water consuming appliances.

BACKGROUND OF THE INVENTION

Certain water heaters include a tank therein. Heating elements, such as gas burners, electric resistance elements, or induction elements, heat water within the tank during operation of such water heaters. During operation, relatively cold water flows into the tank, and the heating elements operate to heat such water to a predetermined temperature. In particular, the heating elements generally heat water within the tank to a very high temperature. A mixing valve may be used to mix the relatively hot water with relatively cold water in order to bring the temperature of such water down to suitable and/or more usable temperatures. The heated water may then be supplied to one or more water consuming appliances through a supply conduit.

Certain water consuming appliances require heated water at relatively low temperatures, e.g., at temperatures safe for direct user contact. For example, to reduce the likelihood of burns, the temperature of water supplied to a plumbing fixture such as a shower head or a sink faucet may need to be limited to 120° F. Therefore, conventional water consuming appliances may be programmed or otherwise configured for supplying water at a set point temperature suitable for safe use in such appliances. The mixing valve of the appliance mixes high temperature water from the tank with cold water from the water supply to supply water at the set point temperature.

However, other water consuming appliances may perform operating cycles that require water at a temperature different than the set point temperature. For example, to perform a sanitization cycle, a dishwasher may require water at a temperature of 160° F. When supplied with water at 120° F., the dishwasher must utilize an internal heater to raise the temperature of the water to the desired target temperature, resulting in extended cycle times and increased energy consumption.

Accordingly, a water supply system with features for providing water consuming appliances with supply water at temperatures above the set point temperature of the water heater would be useful. More specifically, a water supply system capable of supplying water at both the set point temperature and a target temperature communicated by a water consuming appliance would be particularly beneficial.

BRIEF DESCRIPTION OF THE INVENTION

The present subject matter provides a system and method of operating a water supply system with one or more water consuming appliances. A water supply system includes a water heater fluidly coupled to a water consuming appliance through a supply conduit. The water consuming appliance includes an appliance communication module for communicating a target temperature. A mixing valve is positioned on the supply conduit and is in operative communication with the appliance communication module. The mixing valve mixes heated water from the water heater and cold water from the water supply to provide a flow of supply water to the water consuming appliance at the target temperature. The water supply system may further include a second water consuming appliance, a second supply conduit, and a second mixing valve for providing the second water consuming appliance with a flow of heated water at a different set point temperature. Additional aspects and advantages of the invention will be set forth in part in the following description, or may be apparent from the description, or may be learned through practice of the invention.

In one exemplary embodiment, a water supply system is provided. The water supply system includes a water heater configured for heating cold water from a water supply. A water consuming appliance includes an appliance communication module for communicating a target temperature and a supply conduit fluidly couples the water heater and the water consuming appliance. A mixing valve is positioned on the supply conduit and is in operative communication with the appliance communication module. The mixing valve is configured for mixing heated water from the water heater and cold water from the water supply to provide a flow of supply water to the water consuming appliance at the target temperature.

In another exemplary embodiment, a method for operating a water supply system is provided. The method includes receiving a communication of a target temperature from a water consuming appliance and adjusting a mixing valve to mix heated water from a water heater and cold water from a water supply to provide a flow of supply water. The method further includes providing the flow of heated water to the water consuming appliance at the target temperature.

In yet another exemplary embodiment, a water supply system is provided. The water supply system includes a water heater configured for heating cold water from a water supply. A first water consuming appliance is in fluid communication with the water heater through a first supply conduit. A first mixing valve is positioned on the first supply conduit and is configured for mixing heated water from the water heater and cold water from the water supply to provide a first flow of supply water to the first water consuming appliance at a set point temperature. A second water consuming appliance is in fluid communication with the water heater through a second supply conduit, the second appliance including an appliance communication module for communicating a target temperature. A second mixing valve is positioned on the second supply conduit and is configured for mixing heated water from the water heater and cold water from the water supply to provide a second flow of supply water to the second water consuming appliance at the target temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a schematic view of certain components of a water supply system including a water heater and water consuming appliances according to an exemplary embodiment of the present subject matter.

FIG. 2 illustrates a method for operating the exemplary water supply system to provide a flow of supply water to one or more water consuming appliances according to an exemplary embodiment of the present subject matter.

FIG. 3 provides a plot of the temperature of water within a wash chamber of an exemplary dishwasher having a water heater during various segments of an operating cycle according to an exemplary embodiment of the present subject matter.

FIG. 4 provides a plot of the temperature of water within a wash chamber of an exemplary dishwasher not having a water heater during a four-fill operating cycle according to an exemplary embodiment of the present subject matter.

FIG. 5 provides a plot of the temperature of water within a wash chamber of an exemplary dishwasher not having a water heater during a seven-fill operating cycle according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water supply system 100 according to an exemplary embodiment of the present subject matter. As illustrated, water supply system 100 generally includes a water heater 102 for supplying heated water to one or more water consuming appliances. As will be described in detail below, water supply system 100 further includes a plurality of fluid supply conduits, mixing valves, temperature sensors, and other components to facilitate the flow of supply water to the one or more water consuming appliances.

As used herein, "water consuming appliance" may refer to any suitable plumbing fixture, household appliance, or any other suitable device configured to draw water from water heater 102. For example, as illustrated in FIG. 1, water heater 102 supplies heated water to a first water consuming appliance, e.g., various plumbing fixtures 104 such as sinks, showers, tubs, etc. In addition, water heater 102 supplies heated water to a second water consuming appliance, e.g., a dishwashing appliance 106. However, it should be appreciated that according to alternative embodiments, any other suitable water consuming appliances may be used while remaining within the scope of the present subject matter. Moreover, water heater 102 may be configured to supply heated water to one or more than two water consuming appliances.

It should be appreciated that water supply system 100 illustrated in the figures is used only for the purpose of explaining aspects of the present subject matter and is not intended to limit the scope of the invention in any manner. For example, water heater 102 may be configured to supply water to any suitable number of water consuming appliances using any suitable number of supply conduits or configurations. Further, it should be understood that as used herein, the term "water" includes purified water and solutions or mixtures containing water and, e.g., elements (such as calcium, chlorine, and fluorine), salts, bacteria, nitrates, organics, and other chemical compounds or substances.

As illustrated and discussed herein, water heater 102 is a conventional electric or gas water heater with a storage tank for storing heated water. However, it should be appreciated that according to alternative embodiments, any other suitable water heating appliance may be used while remaining within the scope of the present subject matter. For example, tankless water heaters, hybrid heat pump water heaters, and solar water heaters could be used instead of the storage tank water heater illustrated in the figures. Indeed, aspects of the present subject matter may be applied for controlling any water supply that is providing a supply of water to a water consuming appliance.

Referring now specifically to FIG. 1, water heater 102 will be described. Water heater 102 includes a casing 110. Inside casing 110, water heater 102 includes a storage tank 112 configured for storing water. Heating elements 114 are positioned inside and/or around storage tank 112 for heating water stored therein. Heating elements 114 may include a gas burner, a heat pump, an electric resistance element, a microwave element, an induction element, a sealed heat pump system or any other suitable heating element or combination thereof.

Water heater 102 also includes a cold water conduit 116 and a hot water conduit 118 that are both in fluid communication with storage tank 112. As an example, cold water from a water source, e.g., a municipal water supply or a well, can enter water heater 102 through cold water conduit 116. From cold water conduit 116, such cold water can enter storage tank 112 wherein it is heated with heating elements 114 to generate heated water. Such heated water can exit water heater 102 at hot water conduit 118 and, e.g., be supplied to a water consuming appliance.

Water heater 102 extends longitudinally between a top portion 120 and a bottom portion 122 along a vertical direction V. Thus, water heater 102 is generally vertically oriented. Water heater 102 can be leveled, e.g., such that casing 110 is plumb in the vertical direction V, in order to facilitate proper operation of water heater 102. A drain pan 124 is positioned at bottom portion 122 of water heater 102 such that water heater 102 sits on drain pan 124. Drain pan 124 sits beneath water heater 102 along the vertical direction V, e.g., to collect water that leaks from water heater 102 or water that condenses on an evaporator of water heater 102. It should be understood that water heater 102 is provided by way of example only and that the present subject matter may be used with any suitable water heater appliance.

Water heater 102 may be placed in fluid communication with plumbing fixtures 104 and dishwasher 106 using any suitable number of supply conduits in any configuration. According to the illustrated embodiment, water heater 102 is placed in fluid communication with plumbing fixtures 104 by a first supply conduit 130. A first mixing valve 132 is operatively coupled to first supply conduit 130 and is configured for regulating a flow of water passing from water heater 102 to plumbing fixtures 104 through first supply conduit 130. In addition, water heater 102 is placed in fluid communication with dishwasher 106 by a second supply conduit 134. A second mixing valve 136 is operatively coupled to second supply conduit 134 and is configured for regulating a flow of water passing from water heater 102 to dishwasher 106 through second supply conduit 134.

As illustrated, each of mixing valves 132, 136 are in fluid communication with cold water conduit 116 and hot water conduit 118 for receiving cold water from the water supply and heated water from water heater 102, respectively. First mixing valve 132 is configured for selectively directing water from cold water conduit 116 and hot water conduit 118 into first supply conduit 130 in order to regulate a temperature of water within first supply conduit 130. Similarly, second mixing valve 136 is configured for selectively directing water from cold water conduit 116 and hot water conduit 118 into second supply conduit 134 in order to regulate a temperature of water within second supply conduit 134. In this regard, mixing valves 132, 136 for example, may be an electronic mixing valve and may be infinitely adjustable in order to permit independent control and fine-tuning of the temperature of water within supply conduits 130, 134.

To facilitate precise flowrates and temperatures of supply water, water supply system 100 may include a number of sensors and measuring devices. For example, water supply system 100 may include a variety of temperature sensors and flow rate sensors. According to the illustrated exemplary embodiment, water heater 102 includes a first temperature sensor 138 positioned on cold water conduit 116, a second temperature sensor 140 positioned on hot water conduit 118, a third temperature sensor 142 on first supply conduit 130, and a fourth temperature sensor 144 on second supply conduit 134. Temperature sensors 138-144 may be any suitable type of temperature sensor. For example, temperature sensors 138-144 may be thermocouples, thermistors, resistance temperature detectors, or any other device suitable for measuring the temperature within the respective fluid conduits. In addition, temperature sensors 138-144 may be positioned and configured in any manner suitable for measuring the temperature of water within the respective conduits.

Water heater 102 further includes a controller 146 that is configured for regulating operation of water heater 102. Controller 146 is in, e.g., operative communication with heating elements 114, mixing valves 132, 136, and temperature sensors 138-144. Thus, controller 146 can selectively activate heating elements 114 in order to heat water within storage tank 112. Similarly, controller 146 can selectively operate mixing valves 132, 136 in order to regulate a temperature of water within supply conduit 130, 134, respectively.

Controller 146 includes memory and one or more processing devices such as microprocessors, CPUs or the like, such as general or special purpose microprocessors operable to execute programming instructions or micro-control code associated with operation of water heater 102. The memory can represent random access memory such as DRAM, or read only memory such as ROM or FLASH. The processor executes programming instructions stored in the memory. The memory can be a separate component from the processor or can be included onboard within the processor. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 146 can be positioned at a variety of locations. In the exemplary embodiment shown in FIG. 1, controller 146 is positioned within water heater 102, e.g., as an integral component of water heater 102. In alternative exemplary embodiments, controller 146 may positioned away from water heater 102 and communicate with water heater 102 over a wireless connection or any other suitable connection, such as a wired connection.

As mentioned above, controller 146 can operate heating elements 114 to heat water within storage tank 112. As an example, a user or the manufacturer can select or establish various operating temperatures associated with water heater 102. Controller 146 may be used for setting the temperature of water within storage tank 112 and/or the temperature of water supplied by mixing valves 132, 136. Alternatively, the various operating temperatures may be default values and may be established or adjusted in any other suitable manner.

As an example, the tank storage temperature may be about 160° F. It should be appreciated, that as used herein, terms of approximation, such as "approximately," "substantially," or "about," refer to being within a ten percent margin of error. Based upon the programmed tank storage temperature, controller 146 can selectively activate heating elements 114 in order to heat water within storage tank 112 to the programmed tank storage temperature.

Similarly, controller 146 can also operate mixing valves 132, 136, e.g., by adjusting their position, to regulate the temperature of water within supply conduits 130, 134. For example, a user can select or establish a predetermined temperature or a set point temperature of first mixing valve 132, or the set point temperature of first mixing valve 132 may be a default value. As an example, the set point temperature may be about 120° F. Based upon the set point temperature of mixing valve 132, controller 146 can adjust the position of first mixing valve 132 in order to change or tweak a ratio of relatively cool water flowing into first supply conduit 130 from cold water conduit 116 and relatively hot water flowing into first supply conduit 130 from hot water conduit 118. In such a manner, first mixing valve 132 can utilize water from cold water conduit 116 and hot water conduit 118 to regulate the temperature of water within first supply conduit 130 to the set point temperature.

Referring still to FIG. 1, according to an exemplary embodiment of the present subject matter, one or more of the water consuming devices and/or mixing valves 132, 136 may be smart appliances that are capable of communication with external devices via a wired or wireless connection. For example, dishwasher 106 may be communicatively coupled to controller 146 and/or second mixing valve 136, as described in more detail below.

As illustrated in FIG. 1, dishwasher 106 is communicatively coupled to both water heater 102 and second mixing valve 136 through a network 148. Network 148 can be any type of communication network. For example, network 148 can include one or more of a wireless network, a wired network, a personal area network, a local area network, a wide area network, the internet, etc. According to an exemplary embodiment, dishwasher 106 and second mixing valve 136 may communicate with each other and/or water heater 102 over network 148, such as the internet, to send and/or receive status information, operating information, or a target temperature, as described below.

To establish communications with network 148, dishwasher 106 includes a controller 150. Various components of exemplary controller 150 are illustrated in schematic fashion in FIG. 1. As shown, controller 150 may include one or more processor(s) 152 and associated memory device(s) 154 configured to perform a variety of computer-implemented functions (e.g., performing the methods, steps, and the like disclosed herein). By way of example, processor 152 may include one or more microprocessors, such as general or special purpose microprocessors operable to execute programming instructions or micro-control code associated with an operating cycle. Memory 154 may represent random access memory such as DRAM, or read only memory such as ROM or FLASH. In one embodiment, processor 152 executes programming instructions stored in memory 154. Memory 154 may be a separate component from processor 152 or may be included onboard within processor 152.

Additionally, controller 150 may also include a communications module 156 to facilitate communications between controller 150 and controller 146 of water heater 102 (or other networked devices). For instance, the communications module 156 may serve as an interface to permit controller 150 to transmit a desired target water temperature and/or receive operating information or requests from other components within water supply system 100. According to some exemplary embodiments, communications module 156 may also include an interface (e.g., one or more analog-to-digital converters) to permit input signals to be converted into signals that can be understood and processed by the processor 152.

As illustrated in FIG. 1, mixing valves 132, 136 are positioned on supply conduits 130, 134, respectively, and are configured for regulating the flow of water through those conduits. Although illustrated as standalone valves, it should be appreciated that mixing valves 132, 136 may be a part of water heater 102, may be positioned at any suitable location along supply conduits 130, 134, or may be positioned adjacent to or may be a part of plumbing fixtures 104 or dishwasher 106. Moreover, water supply system 100 may include additional water consuming devices, supply conduits, and mixing valves according to alternative embodiments.

According to the illustrated embodiment, second mixing valve 136 may also include a controller 160 for communicating with water heater 102, dishwasher 106, or other networked devices. More specifically, various components of exemplary controller 160 are illustrated in schematic fashion in FIG. 1. As shown, controller 160 may include one or more processor(s) 162 and associated memory device(s) 164 configured to perform a variety of computer-implemented functions (e.g., performing the methods, steps, and the like disclosed herein). By way of example, processor 162 may include one or more microprocessors, such as general or special purpose microprocessors operable to execute programming instructions or micro-control code associated with an operating cycle. Memory 164 may represent random access memory such as DRAM, or read only memory such as ROM or FLASH. In one embodiment, processor 162 executes programming instructions stored in memory 164. Memory 164 may be a separate component from processor 162 or may be included onboard within processor 162.

Additionally, controller 160 may also include a communications module 166 to facilitate communications between and among controllers connected to network 148, e.g., controllers 146 and 150, or other networked devices. For instance, the communications module 166 may serve as an interface to permit controller 160 to transmit operating information or temperatures and/or receive a requested target temperature from dishwasher 106. According to some exemplary embodiments, communications module 166 may also include an interface (e.g., one or more analog-to-digital converters) to permit input signals to be converted into signals that can be understood and processed by the processor 162. Although controller 160 is illustrated as being a dedicated controller positioned on second mixing valve 136, it should be appreciated that controller 160 and its various parts may be wholly or partially incorporated into controller 146 of water heater 102.

Now that the construction and configuration of water supply system 100 according to an exemplary embodiment of the present subject matter has been presented, an exemplary method 200 for operating a water supply system according to an exemplary embodiment of the present subject matter is provided. Method 200 can be used to operate any suitable water supply system or water consuming appliance. For example, method 200 may be utilized to operate water supply system 100 (FIG. 1) to facilitate the supply of water at target temperatures required by dishwasher 106. In this regard, for example, controllers 146, 150, and 160 may be either collectively or individually programmed to implement method 200.

In general, method 200 may be used to provide a flow of heated water to dishwasher 106 at a desired target temperature. Method 200 includes, at step 210, receiving a communication of a target temperature from a water consuming appliance. For example, using water supply system 100 as an example, step 210 may include dishwasher 106 communicating with controller 160 of second mixing valve 136 to request supply water at the target temperature. According to one embodiment, the requested temperature may be higher than the temperature of the water being supplied by first mixing valve 132. However, according to alternative embodiments, the target temperature may be the same as, or lower than, the temperature of the water being supplied by first mixing valve 132.

Method 200 further includes, at step 220, adjusting a mixing valve to mix heated water from a hot water heater and cold water from a water supply to provide a flow of supply water at the target temperature. Step 230 includes providing the flow of heated water to the water consuming appliance at the target temperature. In this manner, a water consuming appliance, e.g., dishwasher 106 may demand water at a target temperature and a mixing valve, e.g., second mixing valve 136 may supply water at that target temperature without affecting the temperature of water supplied to other water consuming appliances within water supply system 100.

According to the exemplary embodiment, method 200 may further include, at step 240, adjusting a second mixing valve to mix heated water from the hot water heater and cold water from the water supply to provide a second flow of supply water at a set point temperature. According to one embodiment, the set point temperature may be higher or lower than the target temperature. For example, the set point temperature may be set by a user of the water heater using the water heater controller and may be the standard temperature provided to various plumbing fixtures. At step 250, the second flow of heated water is provided to a second water consuming appliance at the set point temperature.

Therefore, method 200 can enable a water consuming appliance, e.g., dishwasher 106 to request supply water at a target temperature suitable for a an operating cycle or a segment of an operating cycle. For example, dishwasher may request supply water at a target temperature of 140° F. for a primary washing segment and may request supply water at a target temperature of 160° F. for a rinse/sanitization segment. Second mixing valve 136 may then provide a flow of water from water heater 102 to dishwasher 106 at the target temperature without affecting the temperature of water supplied to plumbing fixtures 104 through first mixing valve 132.

Referring now to FIG. 3, a plot of the temperature of water within a wash chamber of a dishwasher appliance over an exemplary operating cycle is illustrated. The dishwasher appliance in this example includes a heater which is energized to heat the water within chamber to a desired temperature during a cleaning cycle. Notably, due to the thermal mass of the dishwasher and the articles positioned therein, even when relatively high temperature water is supplied from the water heater, the measured chamber water temperature will take some time to increase to the desired levels. Nevertheless, significant cycle time improvements may be achieved using water supply system 100 and/or method 200 described above.

The plot illustrates several segments of an exemplary wash cycle, such as a pre-wash segment (indicated by reference numeral 302), a wash segment (indicated by reference numeral 304), a pre-rinse segment (indicated by reference numeral 306), and a rinse/sanitization segment (indicated by reference numeral 308). The plot illustrates chamber temperatures both when the temperature of the supply water is relatively high (e.g., 160° F.) and relatively low (e.g., 120° F.). Notably, by supplying water with a higher inlet temperature (e.g., 160° F.), the time required for all cycle segments, but particularly wash segment 304 and a rinse segment 308, may be reduced relative to the same segments when water is supplied at a relatively lower inlet temperature (e.g., 120° F.). More specifically, using supply water having a higher inlet temperature cuts the time required for the wash segment 304 from 24 minutes to 10 minutes. Similarly, using supply water having a higher inlet temperature cuts the time required for the rinse segment 308 from 35 minutes to 18 minutes. Notably, this can result in significant energy savings as well as quicker overall wash times and increased user satisfaction.

Referring now to FIGS. 4 and 5, plots of the temperature of water within a wash chamber of a dishwasher appliance over an exemplary operating cycle (a 4-segment and a 7-segment cycle, respectively) is illustrated. Notably, because water is supplied to the dishwasher at the desired operating temperatures, the dishwasher appliance according to this example need not include a heater for increasing the water temperature. Moreover, because each cycle segment may require a different water temperature, the dishwasher may request supply water at a different temperature for each segment of the cycle to improve appliance performance and efficiency. In this example, the cost and complexity of the dishwasher may be decreased because it does not require a heater to heat the water. Moreover, because the water heater is more efficient in heating water than an internal heater in a dishwasher, the water supply system operates more efficiently as a whole.

Although the water supply system 100 and method 200 described above illustrate a single dishwasher requesting supply water at a target temperature that is higher than the water temperature delivered to other plumbing fixtures, it should be appreciated that more or fewer appliances and fixtures may be used. Moreover, some or all of the appliances and fixtures may be connected to the network and may request supply water at any suitable temperature. For example, according to another exemplary embodiment, the dishwasher could request water at a colder temperature (e.g., 110° F.) to create an environment suitable for enzyme activity. According to still another embodiment, a clothes washing appliance could be connected to the water heater through a supply conduit and may request high temperature water for sanitization and whitening or low temperature water for washing sensitive garments. Other system configurations and applications are also possible and within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water supply system comprising:
   a water heater configured for heating cold water from a water supply;
   a first water consuming appliance fluidly coupled to the water heater by
   a first supply conduit;
   a second water consuming appliance fluidly coupled to the water heater by a
   a second supply conduit;
   a first mixing valve positioned on the first supply conduit and being configured for mixing heated water from the water heater and cold water from the water supply to provide a first flow of supply water to the first water consuming appliance at a target temperature, the first mixing valve having a first valve communication module;
   an appliance communication module mounted within the first water consuming appliance, the appliance communication module being configured to communicate the target temperature directly to the first valve communication module of the first mixing valve; and
   a second mixing valve positioned on the second supply conduit and being configured for mixing heated water from the water heater and cold water from the water supply to provide a second flow of supply water to the second water consuming appliance, the second flow of water being at a set point temperature.

2. The water supply system of claim 1, wherein the set point temperature is lower than the target temperature.

3. The water supply system of claim 1, wherein the appliance communication module and the first valve communication module are in wireless communication.

4. The water supply system of claim 1, wherein a controller of the water heater comprises the first valve communication module.

5. The water supply system of claim 1, wherein the first water consuming appliance is a dishwasher or a clothes washing machine and the target temperature is selected to correspond to a sanitization cycle temperature.

6. The water supply system of claim 1, wherein the second water consuming appliance is selected from the group consisting of a sink, a shower, and a tub.

* * * * *